United States Patent Office 3,679,665
Patented July 25, 1972

3,679,665
LACTAM-N-CARBOXYLIC ACID CHLORIDES AND
THEIR PRODUCTION
Hans Kiefer, Wachenheim, Germany, assignor to Badische
Anilin- & Soda-Fabrik Aktiengesellschaft, Ludwigshafen (Rhine), Germany
No Drawing. Filed Sept. 22, 1969, Ser. No. 860,025
Int. Cl. C07d 41/06
U.S. Cl. 260—239.3 R                        6 Claims

ABSTRACT OF THE DISCLOSURE

The production of lactam-N-carboxylic acid chlorides having 5 to 13 ring members by reacting with a hydrogen halide a 1-aza-2-hydroxycycloalkene-(2)-carboxylic acid chloride-(1) which is etherified in the 2-position. Lactam-N-carboxylic acid chlorides are suitable for the production of N-substituted lactams from which the correspondingly substituted polyamides may be produced.

The invention relates to a process for the production of lactam-N-carboxylic acid chlorides from 1-aza-2-hydroxycycloalkene-(2)-carboxylic acid chlorides-(1) etherified in the 2-position.

An object of the invention is new lactam-N-carboxylic acid chlorides having 5 to 13 ring members and having the general formula:

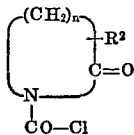

where $R^2$ denotes a hydrogen atom, an alkyl radical having 1 to 20 carbon atoms or a halogen atom and $n$ denotes one of the integers from 3 to 11. Another object of the invention is the production, in good yields and in a simple way, of lactam-N-carboxylic acid chlorides having 5 to 13 ring members.

In accordance with this invention these and other objects and advantages are achieved in a process for the production of lactam-N-carboxylic acid chlorides having 5 to 13 ring members in which a hydrogen halide is reacted with a 1-aza-2-hydroxycycloalkene-(2)-carboxylic acid chloride-(1) which is etherified in the 2-position.

Preferred 1-aza-2-hydroxycycloalkene-(2)-carboxylic acid chlorides-(1) etherified in the 2-position are those having the general formula:

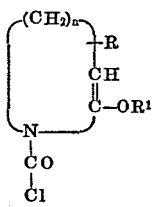

where $R^1$ denotes a lower alkyl radical having 1 to 4 carbon atoms, R denotes a hydrogen atom, an alkyl radical having 1 to 20 carbon atoms and $n$ denotes one of the integers from 2 to 10. In particularly preferred starting materials having the above formula, $R^1$ denotes a methyl group or ethyl group and $R^2$ denotes a hydrogen atom and $n$ one of the integers from 2 to 10. Examples of suitable starting materials are: 1-aza-2-methoxycyclopentene-(2)-carboxylic acid chloride-(1), 1-aza-2-methoxyclcloheptene-(2)-carboxylic acid chloride-(1), 1-aza-2-ethoxycycloheptene-(2)-carboxylic acid chloride-(1), 1-aza-2-methoxycyclononene-(2)-carboxylic acid chloride-(1) and 1-aza-2-methoxycyclotridecene-(2)-carboxylic acid chloride-(1).

The reaction is carried out with a hydrogen halide. Hydrogen chloride and hydrogen bromide are particularly suitable; hydrogen chloride is preferred because it is easily accessible.

Generally, about 1 mole of hydrogen halide is used to 1 mole of 1-aza-2-hydroxycycloalkene-(2)-carboxylic acid chloride-(1) etherified in the 2-position. It has proved to be advantageous to use the hydrogen halide in an excess, for example of up to 2 moles.

The reaction is advantageously carried out at temperatures of from 0° to 100° C. Particularly good results are achieved by carrying out the reaction at temperatures of from 20° to 100° C.

It is advantageous to use a solvent in the reaction. Examples of suitable solvents are hydrocarbons such as cyclohexane or benzene, chlorohydrocarbons such as carbon tetrachloride or chloroform. Solvents in which hydrogen halides are easily soluble, for example ethers such as diethyl ether, dibutyl ether, tetrahydrofurane or dioxane, are particularly suitable.

The process according to the invention may for example be carried out by placing the 1-aza-2-hydroxycycloalkene-(2)-carboxylic acid chloride-(1) etherified in the 2-position in a reactor, advantageously dissolved in one of the said solvents, and passing in hydrogen halide in the specified amounts at the specified temperatures. The lactam-N-carboxylic acid chloride may be recovered from the resultant solution by known methods, for example by distillation, if necessary after removal of any solvent used.

The lactam-N-carboxylic acid chlorides prepared by the process according to this invention are suitable for the production of N-substituted lactams which can be processed into the corresponding polymers.

The following examples illustrate the invention. The parts given in the following examples are by weight. They bear the same relation to parts by volume as the kilogram to the liter.

EXAMPLE 1

Dry hydrogen chloride is passed at 36° C. into a solution of 189.5 parts of 1-aza-2-methoxycycloheptene-(2)-carboxylic acid chloride-(1) in 150 parts by volume of anhydrous ether until it is saturated. Methyl chloride escapes from the boiling mixture at the top of a reflux condenser. When the reaction is over, the solvent is distilled off and the residue is distilled in vacuo. 169 parts (96% of the theory) of caprolactam-N-carboxylic acid chloride is obtained as a colorless oil having the boiling point 97° C. at 0.1 mm. Hg.

EXAMPLE 2

Dry hydrogen chloride is passed, at 70° C. and while stirring, into a solution of 109 parts of 1-aza-2-methoxycyclononene-(2) carboxylic acid chloride-(1) in 150 parts by volume of anhydrous dioxane until the solution is saturated. Hydrogen chloride is passed through the reaction mixture for another two hours at 70° C. The dioxane is distilled off. The residue is then distilled in vacuo. 94 parts (92% of the theory) of capryllactam-N-carboxylic acid chloride having a boiling point of 110° C. at 0.02 mm. Hg is obtained.

EXAMPLE 3

The procedure of Example 1 is followed, except that the 1-aza-2-methoxycycloheptene - (2) - carboxylic acid chloride-(1) is replaced by 274.5 parts of 1-aza-2-methoxycyclotridecene-(2)-carboxylic acid chloride-(1). 241 parts of laurolactam-N-carboxylic acid chloride is obtained by a similar isolation procedure as a colorless oil which crystallizes at 18° C. The yield is 93% of the theory.

I claim:
1. A process for the production of a lactam-N-carboxylic acid chloride having 5 to 13 ring members which comprises reacting (A) a 1-aza-2-hydroxycycloalkene-(2)-carboxylic acid chloride-(1) which is etherified in the 2-position with (B) 1 to 2 moles of hydrogen chloride or hydrogen bromide per mole of (A) at a temperature of from 0 to 110° C.

2. A process as claimed in claim 1 wherein the starting material (A) is a compound of the formula:

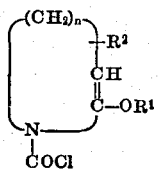

wherein $R^1$ denotes methyl or ethyl $R^2$ denotes hydrogen and $n$ is one of the integers from 2 to 10.

3. A process as claimed in claim 1 in which reactant (B) is hydrogen chloride.

4. A process as claimed in claim 1 in which reactant (B), is hydrogen bromide.

5. A process as claimed in claim 1 carried out at a temperature of from 20° to 100° C.

6. A process as claimed in claim 1 carried out in the presence of a solvent in which hydrogen halide dissolves readily.

References Cited

Fawcett et al.: "J. Am. Chem. Soc.", vol. 84, pp. 4275–4285 (1962).

HENRY R. JILES, Primary Examiner

R. T. BOND, Assistant Examiner

U.S. Cl. X.R.

260—326.3, 293.86, 78 R

PO-1050
(5/69)

UNITED STATES PATENT OFFICE
CERTIFICATE OF CORRECTION

Patent No. 3,679,665              Dated July 25, 1972

Inventor(s)  Hans Kiefer

It is certified that error appears in the above-identified patent and that said Letters Patent are hereby corrected as shown below:

Column 1, line 7, insert ---Claims priority, application Austria, September 25, 1968, A9340/68 ---.

Column 2, line 13, "0° to 100° C." should read --0° to 110°C. ---

Column 3, line 19, "wherein" should read --where --.

Column 4, line 4, "(B)," should read -- (B) --.

Signed and sealed this 2nd day of January 1973.

(SEAL)
Attest:

EDWARD M. FLETCHER, JR.            ROBERT GOTTSCHALK
Attesting Officer                  Commissioner of Patents